United States Patent
Wu et al.

(10) Patent No.: US 9,960,829 B2
(45) Date of Patent: May 1, 2018

(54) CHANNEL STATE INFORMATION FEEDBACK METHOD AND APPARATUS

(71) Applicant: Huawei Technologies Co., Ltd., Shenzhen, Guangdong (CN)

(72) Inventors: Qiang Wu, Beijing (CN); Leiming Zhang, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 15/073,147

(22) Filed: Mar. 17, 2016

(65) Prior Publication Data

US 2016/0197662 A1    Jul. 7, 2016

Related U.S. Application Data

(63) Continuation of application No. PCT/CN2013/083796, filed on Sep. 18, 2013.

(51) Int. Cl.
*H04B 7/06* (2006.01)
*H04L 1/00* (2006.01)
(Continued)

(52) U.S. Cl.
CPC ......... *H04B 7/0632* (2013.01); *H04B 7/0639* (2013.01); *H04L 1/0026* (2013.01);
(Continued)

(58) Field of Classification Search
CPC ......... H04B 7/06; H04B 7/0632; H04L 27/00; H04W 24/02; H04W 72/04
See application file for complete search history.

(56) References Cited

U.S. PATENT DOCUMENTS 8,798,201 B2 *  8/2014  Kim .................... H04B 7/0632
                                                                375/299
2009/0147865 A1   6/2009  Zhang et al.
(Continued)

FOREIGN PATENT DOCUMENTS

CN     101400074 A      4/2009
CN     102480344 A      5/2012
(Continued)

OTHER PUBLICATIONS

Samsung, CQI report formats, 3GPP TSG-RAN WG1#52 R1-080695, Feb. 6, 2008.
(Continued)

*Primary Examiner* — Andrew Lai
*Assistant Examiner* — Leon Andrews

(57) ABSTRACT

The present invention discloses a channel state information feedback method and apparatus. User equipment determines a PMI and a CQI, and a feedback expression manner of the PMI and the CQI, where the feedback expression manner includes a first or a second feedback expression manner, and sends the PMI and the CQI to a network device in the determined feedback expression manner of the PMI and the CQI, where the first feedback expression manner includes: using T CQI values to express CQI of M codewords, and using one PMI value to indicate one PMI, where T is less than M, and there is at least one CQI value that can express CQI of at least two codewords; and the second feedback expression manner includes: using M CQI values to express CQI of M codewords. The present invention may be applied to a scenario in which an antenna quantity increases.

19 Claims, 5 Drawing Sheets

(51) Int. Cl.
    *H04W 24/02*     (2009.01)
    *H04W 72/04*     (2009.01)
    *H04W 88/02*     (2009.01)

(52) U.S. Cl.
    CPC ........... *H04L 1/0028* (2013.01); *H04W 24/02* (2013.01); *H04W 72/042* (2013.01); *H04W 88/02* (2013.01)

(56) References Cited

U.S. PATENT DOCUMENTS

| | | |
|---|---|---|
| 2010/0311430 A1 | 12/2010 | Katayama et al. |
| 2012/0039369 A1 | 2/2012 | Choi et al. |
| 2012/0076028 A1 | 3/2012 | Ko et al. |
| 2012/0201321 A1 | 8/2012 | Koivisto et al. |
| 2013/0230007 A1 | 9/2013 | Nagata et al. |
| 2015/0156000 A1 | 6/2015 | Ko et al. |

FOREIGN PATENT DOCUMENTS

| | | |
|---|---|---|
| JP | 2012080396 A | 4/2012 |
| JP | 2013529430 A | 7/2013 |
| WO | 2012044088 A3 | 4/2012 |

OTHER PUBLICATIONS

Alcatel-Lucent, Alcatel-Lucent Shanghai Bell, Introduction of Rel 12 feature for Downlink MIMO Enhancement, 3GPP TSG-RAN WG1#74 R1-132961, Aug. 10, 2013.

"Remaining details of CSI reporting modes on PUCCH", Alcatel-Lucent, Alcatel-Lucent Shanghai Bell, 3GPP TSG RAN WG1 Meeting #63, Nov. 15-19, 2010, 17 pages, R1-105989.

"Design Aspects of MIMO-Related UE Feedback", Texas Instruments, 3GPP TSG RAN WG1 49, Mar. 26-30, 2007, 4 pages, R1-072213.

\* cited by examiner

CQI represents both CQI 1 and CQI 2

CQI represents both CQI 1 and CQI 2

CHANNEL STATE INFORMATION FEEDBACK METHOD AND APPARATUS

CROSS-REFERENCE TO RELATED APPLICATION

This application is a continuation of International Application No. PCT/CN2013/083796, filed on Sep. 18, 2013, which is incorporated herein by reference in its entirety.

TECHNICAL FIELD

Embodiments of the present invention relate to the field of communications technologies, and in particular, to a channel state information feedback method and apparatus.

BACKGROUND

In a Long Term Evolution (LTE) LTE/LTE-Advanced (LTE-A) system of the 3rd Generation Partnership Project (3GPP), Orthogonal Frequency Division Multiple Access (OFDMA) is used as a downlink multiple access mode, and therefore a downlink resource of the system is divided into OFDM symbols in terms of time, and is divided into subcarriers in terms of frequency. Each OFDM symbol has a Cyclic Prefix (CP). There are types of CPs: normal CP (normal CP) and extended CP (extended CP). When abase station schedules, in a downlink subframe, User Equipment (UE), that is, the base station needs to transmit, in the downlink subframe, downlink data to the UE, the minimum unit of a physical resource allocated to each UE is a Physical Resource Block (PRB). One PRB includes 12 subcarriers in a frequency domain, and is of half a subframe duration (that is, one timeslot) in a time domain, that is, includes seven OFDM symbols (if the normal CP is used) or six OFDM symbols (in a case in which the extended CP is used). One physical resource block pair includes 12 subcarriers in the frequency domain, and is of one subframe duration (that is, two timeslots) in the time domain.

Currently, in open-loop Multiple Input Multiple Output (MIMO) in the LTE R8, a maximum of four transmit antennas are supported. Rank-2, 3, or 4 transmission is supported. In open-loop MIMO, a Pre-coding Matrix Indicator (PMI) of a pre-coding matrix is not fed back; and when a rank (rank) is greater than or equal to 2, two channel coding codewords (codeword) are used to perform sending when a base station sends data. Four transmit antennas are used as an example; when sending data to UE, a base station performs, in a PRB pair that is scheduled to the UE, pre-coding by fixedly using, according to a rule, four pre-coding matrices of index numbers 12 to 15 rotationally. During feedback, Channel Quality Information (CQI) of only one codeword is fed back. In an open-loop mode, the reason that one piece of CQI may be fed back is that, in the open-loop MIMO mode, it is equivalent that layer shifting exists on adjacent subcarriers for two codewords, so that the two codewords pass through an approximately same channel, and therefore channel quality is also approximately the same. Therefore, CQI of one codeword may be used to express CQI of two codewords. For example, in rank-2 transmission (layers=2), on subcarriers n and n+1, pre-coding is performed by using a pre-coding matrix of an index 12. On the subcarrier n, codeword 1 is mapped to a first layer, codeword 2 is mapped to a second layer; however, on the subcarrier n+1, codeword 1 is mapped to the second layer, and codeword 1 is mapped to the first layer. Channels for adjacent subcarriers are basically the same, and therefore it may be considered that the two codewords pass through a same channel on the two subcarriers, and channel quality is also the same; therefore CQI of the two codewords may be expressed by using CQI of one codeword.

Currently, in LTE Rel.8/9/10/11, sending by using one, two, four, or eight antennas is supported in downlink transmission. In the closed-loop MIMO mode, Channel State Information (CSI) that User Equipment (UE) needs to feed back includes a rank indicator (rank indicator, RI), a PMI, CQI, and the like, where the RI and the PMI respectively indicate a layer quantity and a pre-coding matrix that the UE expects a base station to use to perform downlink data transmission. When the RI is greater than or equal to 2, two channel coding codewords (codeword) are used to perform sending when a base station sends data; in this case, an expression manner for CSI feedback by UE needs to include one PMI value, and CQI of two codewords. In the closed-loop MIMO mode, two codewords are mapped on a same subcarrier to different layers respectively; and a relationship of mapping, on all subcarriers, of either codeword to a layer, is the same, that is, no layer shifting exists. The two codewords pass through different channels; therefore CQI of the two codewords is independent from each other, and CQI of one codeword cannot be used to express the CQI of the two codewords. Therefore, the UE needs to separately feed back the CQI of the two codewords.

However, in the existing closed-loop MIMO mode, the expression manner for CSI feedback by UE is applicable if a quantity of configured antennas does not exceed eight; and when a quantity of downlink transmit antennas increases, for example, the quantity of downlink transmit antennas is 16, 32, or 64, no corresponding CSI feedback solution is provided in the prior art.

SUMMARY

The present invention provides a channel state information feedback method and apparatus for closed-loop MIMO, which can be effectively applied to a scenario in which a quantity of configured antennas increases.

According to a first aspect, a channel state information feedback method is provided, including:

determining, by user equipment, a pre-coding matrix indicator PMI and a channel quality information CQI that need to be fed back, and a feedback expression manner of the PMI and the CQI, where the feedback expression manner refers to a manner used to express the PMI and the CQI when the user equipment feeds back the PMI and the CQI, and the feedback expression manner includes at least a first feedback expression manner or a second feedback expression manner; and sending, by the user equipment, the PMI and the CQI to a network device in the determined feedback expression manner, where the first feedback expression manner includes: using T CQI values to express CQI of M codewords, and using one PMI value to indicate one PMI, where T is less than M and is greater than or equal to 1, M is greater than or equal to 2, and at least one CQI value of the T CQI values can express channel quality information of at least two codewords; and the second feedback expression manner includes: using M CQI values to express CQI of M codewords, and using one PMI value to indicate one PMI, where a bit quantity of at least one CQI value of the M CQI values is less than 3, and a bit quantity of at least one CQI value is greater than 3; where in any downlink physical resource block PRB pair that corresponds to the PMI and the CQI, any codeword of the M codewords is mapped on different downlink subcarriers to a same layer.

Based on the first aspect, in a first possible implementation manner, the determining, by user equipment, a feedback expression manner of the PMI and the CQI includes:

determining, by the user equipment, the feedback expression manner of the PMI and the CQI according to antenna configuration information; or determining, by the user equipment, the feedback expression manner of the PMI and the CQI according to higher layer signaling sent by the network device, where the higher layer signaling includes the feedback expression manner of the PMI and the CQI.

Based on the first possible implementation manner of the first aspect, in a second possible implementation manner, the antenna configuration information includes a quantity of configured antennas, and the determining, by the user equipment, the feedback expression manner of the PMI and the CQI according to antenna configuration information includes:

if the quantity of configured antennas is greater than or equal to a first antenna quantity threshold, determining that the feedback expression manner of the PMI and the CQI is the first feedback expression manner or the second feedback expression manner;

if the quantity of configured antennas is less than the first antenna quantity threshold, and is greater than or equal to a second antenna quantity threshold, determining that the feedback expression manner of the PMI and the CQI is the second feedback expression manner; or if the quantity of configured antennas is less than the second antenna quantity threshold, determining that the feedback expression manner of the PMI and the CQI is a third feedback expression manner, where the third feedback expression manner includes: using four bits of one Physical Uplink Control Channel (PUCCH) to express CQI of a first codeword, using three bits of one PUCCH to express CQI of a second codeword, and using four bits of one PUCCH to express the PMI.

Based on the second possible implementation manner of the first aspect, in a third possible implementation manner, the antenna configuration information further includes an antenna configuration pattern, and the antenna configuration pattern includes horizontal antenna configuration and vertical antenna configuration; and the, if the quantity of configured antennas is greater than or equal to a first antenna quantity threshold, determining that the feedback expression manner of the PMI and the CQI is the first feedback expression manner or the second feedback expression manner includes:

if it is determined that the quantity of configured antennas is greater than or equal to the first antenna quantity threshold, and in the quantity of configured antennas, a quantity of horizontally configured antennas is greater than a quantity of vertically configured antennas, determining that the feedback expression manner of the PMI and the CQI is the first feedback expression manner; or if it is determined that the quantity of configured antennas is greater than or equal to the first antenna quantity threshold, and in the quantity of configured antennas, a quantity of horizontally configured antennas is less than a quantity of vertically configured antennas, determining that the feedback expression manner of the PMI and the CQI is the second feedback expression manner; or if it is determined that the quantity of configured antennas is greater than or equal to the first antenna quantity threshold, and in the quantity of configured antennas, a quantity of horizontally configured antennas is equal to a quantity of vertically configured antennas, determining that the feedback expression manner of the PMI and the CQI is the first feedback expression manner or the second feedback expression manner.

Based on the second or the third possible implementation manner of the first aspect, in a fourth possible implementation manner, the first antenna quantity threshold is 32, and the second antenna quantity threshold is 16.

Based on the first aspect or any one of the first to the fourth possible implementation manners of the first aspect, in a fifth possible implementation manner, if M is equal to 2, the first feedback expression manner includes: using four bits of one PUCCH to express CQI of a first codeword and CQI of a second codeword, and using four or seven bits of one PUCCH to express the PMI.

Based on the first aspect or any one of the first to the fourth possible implementation manners of the first aspect, in a sixth possible implementation manner, if M is equal to 2, the second feedback expression manner includes: using four bits of one PUCCH to express CQI of a first codeword, using less than three bits of one PUCCH to express CQI of a second codeword, and using four bits of one PUCCH to express the PMI.

According to a second aspect, a channel state information feedback apparatus is provided, including:

a determining module, configured to determine a precoding matrix indicator PMI and a channel quality information CQI that need to be fed back, and a feedback expression manner of the PMI and the CQI, where the feedback expression manner refers to a manner used to express the PMI and the CQI when the user equipment feeds back the PMI and the CQI, and the feedback expression manner includes at least a first feedback expression manner or a second feedback expression manner; and a sending module, configured to send the PMI and the CQI to a network device in the determined feedback expression manner, where the first feedback expression manner includes: using T CQI values to express CQI of M codewords, and using one PMI value to indicate one PMI, where T is less than M and is greater than or equal to 1, M is greater than or equal to 2, and at least one CQI value of the T CQI values can express channel quality information of at least two codewords; and the second feedback expression manner includes: using M CQI values to express CQI of M codewords, and using one PMI value to indicate one PMI, where a bit quantity of at least one CQI value of the M CQI values is less than 3, and a bit quantity of at least one CQI value is greater than 3; where in any downlink physical resource block PRB pair that corresponds to the PMI and the CQI, any codeword of the M codewords is mapped on different downlink subcarriers to a same layer.

Based on the second aspect, in a first possible implementation manner, the determining module is specifically configured to:

determine the feedback expression manner of the PMI and the CQI according to antenna configuration information; or the apparatus further includes:

a receiving module, configured to receive higher layer signaling sent by the network device, where the higher layer signaling includes the feedback expression manner of the PMI and the CQI, where the determining module is specifically further configured to determine the feedback expression manner of the PMI and the CQI according to the higher layer signaling received by the receiving module and sent by the network device.

Based on the first possible implementation manner of the second aspect, in a second possible implementation manner, the antenna configuration information includes a quantity of configured antennas, and the determining module is specifically configured to:

if the quantity of configured antennas is greater than or equal to a first antenna quantity threshold, determine that the feedback expression manner of the PMI and the CQI is the first feedback expression manner or the second feedback expression manner;

if the quantity of configured antennas is less than the first antenna quantity threshold, and is greater than or equal to a second antenna quantity threshold, determine that the feedback expression manner of the PMI and the CQI is the second feedback expression manner; or if the quantity of configured antennas is less than the second antenna quantity threshold, determine that the feedback expression manner of the PMI and the CQI is a third feedback expression manner, where the third feedback expression manner includes: using four bits of one PUCCH to express CQI of a first codeword, using three bits of one PUCCH to express CQI of a second codeword, and using four bits of one PUCCH to express the PMI.

Based on the second possible implementation manner of the second aspect, in a third possible implementation manner, the antenna configuration information further includes an antenna configuration pattern, and the antenna configuration pattern includes horizontal antenna configuration and vertical antenna configuration; and the determining module is specifically configured to:

if it is determined that the quantity of configured antennas is greater than or equal to the first antenna quantity threshold, and in the quantity of configured antennas, a quantity of horizontally configured antennas is greater than a quantity of vertically configured antennas, determine that the feedback expression manner of the PMI and the CQI is the first feedback expression manner; or if it is determined that the quantity of configured antennas is greater than or equal to the first antenna quantity threshold, and in the quantity of configured antennas, a quantity of horizontally configured antennas is less than a quantity of vertically configured antennas, determine that the feedback expression manner of the PMI and the CQI is the second feedback expression manner; or if it is determined that the quantity of configured antennas is greater than or equal to the first antenna quantity threshold, and in the quantity of configured antennas, a quantity of horizontally configured antennas is equal to a quantity of vertically configured antennas, determine that the feedback expression manner of the PMI and the CQI is the first feedback expression manner or the second feedback expression manner.

Based on the second or the third possible implementation manner of the second aspect, in a fourth possible implementation manner, the first antenna quantity threshold is 32, and the second antenna quantity threshold is 16.

Based on the second aspect or any one of the first to the fourth possible implementation manners of the second aspect, in a fifth possible implementation manner, if M is equal to 2, the first feedback expression manner includes: using four bits of one PUCCH to express CQI of a first codeword and CQI of a second codeword, and using four or seven bits of one PUCCH to express the PMI.

Based on the second aspect or any one of the first to the fourth possible implementation manners of the second aspect, in a sixth possible implementation manner, if M is equal to 2, the second feedback expression manner includes: using four bits of one PUCCH to express CQI of a first codeword, using less than three bits of one PUCCH to express CQI of a second codeword, and using four bits of one PUCCH to express the PMI.

According to a third aspect, user equipment is provided, including: a processor and a transmitter, where the processor is connected to the transmitter by using a communications bus;

the processor is configured to determine a pre-coding matrix indicator PMI and channel a quality information CQI that need to be fed back, and a feedback expression manner of the PMI and the CQI, where the feedback expression manner refers to a manner used to express the PMI and the CQI when the user equipment feeds back the PMI and the CQI, and the feedback expression manner includes at least a first feedback expression manner or a second feedback expression manner; and the transmitter is configured to send the PMI and the CQI to a network device in the feedback expression manner determined by the processor, where the first feedback expression manner includes: using T CQI values to express CQI of M codewords, and using one PMI value to indicate one PMI, where T is less than M and is greater than or equal to 1, M is greater than or equal to 2, and at least one CQI value of the T CQI values can express channel quality information of at least two codewords; and the second feedback expression manner includes: using M CQI values to express CQI of M codewords, and using one PMI value to indicate one PMI, where a bit quantity of at least one CQI value of the M CQI values is less than 3, and a bit quantity of at least one CQI value is greater than 3; where in any downlink physical resource block PRB pair that corresponds to the PMI and the CQI, any codeword of the M codewords is mapped on different downlink subcarriers to a same layer.

Based on the third aspect, in a first possible implementation manner, the processor is specifically configured to:

determine the feedback expression manner of the PMI and the CQI according to antenna configuration information; or the user equipment further includes:

a receiver, connected to the processor by using the communications bus, configured to receive higher layer signaling sent by the network device, where the higher layer signaling includes the feedback expression manner of the PMI and the CQI; and the processor is specifically further configured to determine the feedback expression manner of the PMI and the CQI according to the feedback expression manner, which is included in the higher layer signaling received by the receiver and sent by the network device, of the PMI and the CQI.

Based on the first possible implementation manner of the third aspect, in a second possible implementation manner, the antenna configuration information includes a quantity of configured antennas, and the processor is specifically configured to:

if the quantity of configured antennas is greater than or equal to a first antenna quantity threshold, determine that the feedback expression manner of the PMI and the CQI is the first feedback expression manner or the second feedback expression manner;

if the quantity of configured antennas is less than the first antenna quantity threshold, and is greater than or equal to a second antenna quantity threshold, determine that the feedback expression manner of the PMI and the CQI is the second feedback expression manner; or if the quantity of configured antennas is less than the second antenna quantity threshold, determine that the feedback expression manner of the PMI and the CQI is a third feedback expression manner, where the third feedback expression manner includes: using four bits of one PUCCH to express CQI of a first codeword, using three bits of one PUCCH to express CQI of a second codeword, and using four bits of one PUCCH to express the PMI.

Based on the second possible implementation manner of the third aspect, in a third possible implementation manner, the antenna configuration information further includes an antenna configuration pattern, and the antenna configuration pattern includes horizontal antenna configuration and vertical antenna configuration; and the processor is specifically configured to:

if it is determined that the quantity of configured antennas is greater than or equal to the first antenna quantity threshold, and in the quantity of configured antennas, a quantity of horizontally configured antennas is greater than a quantity of vertically configured antennas, determine that the feedback expression manner of the PMI and the CQI is the first feedback expression manner; or if it is determined that the quantity of configured antennas is greater than or equal to the first antenna quantity threshold, and in the quantity of configured antennas, a quantity of horizontally configured antennas is less than a quantity of vertically configured antennas, determine that the feedback expression manner of the PMI and the CQI is the second feedback expression manner; or if it is determined that the quantity of configured antennas is greater than or equal to the first antenna quantity threshold, and in the quantity of configured antennas, a quantity of horizontally configured antennas is equal to a quantity of vertically configured antennas, determine that the feedback expression manner of the PMI and the CQI is the first feedback expression manner or the second feedback expression manner.

Based on the second or the third possible implementation manner of the third aspect, in a fourth possible implementation manner, the first antenna quantity threshold is 32, and the second antenna quantity threshold is 16.

Based on the third aspect or any one of the first to the fourth possible implementation manners of the third aspect, in a fifth possible implementation manner, if M is equal to 2, the first feedback expression manner includes: using four bits of one PUCCH to express CQI of a first codeword and CQI of a second codeword, and using four or seven bits of one PUCCH to express the PMI.

Based on the third aspect or any one of the first to the fourth possible implementation manners of the third aspect, in a sixth possible implementation manner, if M is equal to 2, the second feedback expression manner includes: using four bits of one PUCCH to express CQI of a first codeword, using less than three bits of one PUCCH to express CQI of a second codeword, and using four bits of one PUCCH to express the PMI.

According to a fourth aspect, a channel state information feedback method is provided, including:

sending, by a network device, antenna configuration information to user equipment, where the antenna configuration information is used by the user equipment to determine, according to a quantity of configured antennas that is included in the antenna configuration information, a precoding matrix indicator PMI and a channel quality information CQI that need to be fed back, and a feedback expression manner of the PMI and the CQI, and send the PMI and the CQI to the network device in the determined feedback expression manner; or determining, by a network device, a feedback expression manner of a PMI and a CQI according to a quantity of configured antennas that is included in the antenna configuration information, and sending the feedback expression manner of the PMI and the CQI to the user equipment; and receiving, by the network device, the PMI and the CQI that are fed back by the user equipment in the feedback expression manner of the PMI and the CQI, where the feedback expression manner refers to a manner used to express the PMI and the CQI when the user equipment feeds back the PMI and the CQI, and the feedback expression manner includes at least a first feedback expression manner or a second feedback expression manner, where the first feedback expression manner includes: using T CQI values to express CQI of M codewords, and using one PMI value to indicate one PMI, where T is less than M and is greater than or equal to 1, M is greater than or equal to 2, and at least one CQI value of the T CQI values can express channel quality information of at least two codewords; and the second feedback expression manner includes: using M CQI values to express CQI of M codewords, and using one PMI value to indicate one PMI, where a bit quantity of at least one CQI value of the M CQI values is less than 3, and a bit quantity of at least one CQI value is greater than 3; where in any downlink physical resource block PRB pair that corresponds to the PMI and the CQI, any codeword of the M codewords is mapped on different downlink subcarriers to a same layer.

Based on the fourth aspect, in a first possible implementation manner, the determining, by the network device, the feedback expression manner of the PMI and the CQI according to the quantity of configured antennas that is included in the antenna configuration information includes:

if the quantity of configured antennas is greater than or equal to a first antenna quantity threshold, determining that the feedback expression manner of the PMI and the CQI is the first feedback expression manner or the second feedback expression manner;

if the quantity of configured antennas is less than the first antenna quantity threshold, and is greater than or equal to a second antenna quantity threshold, determining that the feedback expression manner of the PMI and the CQI is the second feedback expression manner; or if the quantity of configured antennas is less than the second antenna quantity threshold, determining that the feedback expression manner of the PMI and the CQI is a third feedback expression manner, where the third feedback expression manner includes: using four bits of one PUCCH to express CQI of a first codeword, using three bits of one PUCCH to express CQI of a second codeword, and using four bits of one PUCCH to express the PMI.

Based on the first possible implementation manner of the fourth aspect, in a second possible implementation manner, the antenna configuration information further includes an antenna configuration pattern, and the antenna configuration pattern includes horizontal antenna configuration and vertical antenna configuration; and the, if the quantity of configured antennas is greater than or equal to a first antenna quantity threshold, determining that the feedback expression manner of the PMI and the CQI is the first feedback expression manner or the second feedback expression manner includes:

if it is determined that the quantity of configured antennas is greater than or equal to the first antenna quantity threshold, and in the quantity of configured antennas, a quantity of horizontally configured antennas is greater than a quantity of vertically configured antennas, determining that the feedback expression manner of the PMI and the CQI is the first feedback expression manner; or if it is determined that the quantity of configured antennas is greater than or equal to the first antenna quantity threshold, and in the quantity of configured antennas, a quantity of horizontally configured antennas is less than a quantity of vertically configured antennas, determining that the feedback expression manner of the PMI and the CQI is the second feedback expression manner; or if it is determined that the quantity of configured antennas is greater than or equal to the first antenna quantity threshold, and in the quantity of configured antennas, a quantity of horizontally configured antennas is equal to a quantity of vertically configured antennas, determining that the feedback expression manner of the PMI and the CQI is the first feedback expression manner or the second feedback expression manner.

Based on the first or the second possible implementation manner of the fourth aspect, in a third possible implementation manner, the first antenna quantity threshold is 32, and the second antenna quantity threshold is 16.

Based on the fourth aspect, in a fourth possible implementation manner, the sending, by the network device, the feedback expression manner of the PMI and the CQI to the user equipment includes:

sending, by the network device, the feedback expression manner of the PMI and the CQI to the user equipment by using higher layer signaling.

According to a fifth aspect, a channel state information feedback apparatus is provided, including:

a sending module, configured to send antenna configuration information to user equipment, where the antenna configuration information is used by the user equipment to determine, according to a quantity of configured antennas that is included in the antenna configuration information, a pre-coding matrix indicator PMI and a channel quality information CQI that need to be fed back, and a feedback expression manner of the PMI and the CQI, and send the PMI and the CQI to the network device in the determined feedback expression manner; or the apparatus further includes:

a determining module, configured to determine a feedback expression manner of a PMI and a CQI according to ae quantity of configured antennas that is included in the antenna configuration information, where the sending module is further configured to send the feedback expression manner of the PMI and the CQI to the user equipment; and a receiving module, configured to receive the PMI and the CQI that are fed back by the user equipment in the feedback expression manner of the PMI and the CQI, where the feedback expression manner refers to a manner used to express the PMI and the CQI when the user equipment feeds back the PMI and the CQI, and the feedback expression manner includes at least a first feedback expression manner or a second feedback expression manner, where the first feedback expression manner includes: using T CQI values to express CQI of M codewords, and using one PMI value to indicate one PMI, where T is less than M and is greater than or equal to 1, M is greater than or equal to 2, and at least one CQI value of the T CQI values can express channel quality information of at least two codewords; and the second feedback expression manner includes: using M CQI values to express CQI of M codewords, and using one PMI value to indicate one PMI, where a bit quantity of at least one CQI value of the M CQI values is less than 3, and a bit quantity of at least one CQI value is greater than 3; where in any downlink physical resource block PRB pair that corresponds to the PMI and the CQI, any codeword of the M codewords is mapped on different downlink subcarriers to a same layer.

Based on the fifth aspect, in a first possible implementation manner, the determining module is specifically configured to:

if the quantity of configured antennas is greater than or equal to a first antenna quantity threshold, determine that the feedback expression manner of the PMI and the CQI is the first feedback expression manner or the second feedback expression manner;

if the quantity of configured antennas is less than the first antenna quantity threshold, and is greater than or equal to a second antenna quantity threshold, determine that the feedback expression manner of the PMI and the CQI is the second feedback expression manner; or if the quantity of configured antennas is less than the second antenna quantity threshold, determine that the feedback expression manner of the PMI and the CQI is a third feedback expression manner, where the third feedback expression manner includes: using four bits of one PUCCH to express CQI of a first codeword, using three bits of one PUCCH to express CQI of a second codeword, and using four bits of one PUCCH to express the PMI.

Based on the first possible implementation manner of the fifth aspect, in a second possible implementation manner, the antenna configuration information further includes an antenna configuration pattern, and the antenna configuration pattern includes horizontal antenna configuration and vertical antenna configuration; and the determining module is specifically configured to:

if it is determined that the quantity of configured antennas is greater than or equal to the first antenna quantity threshold, and in the quantity of configured antennas, a quantity of horizontally configured antennas is greater than a quantity of vertically configured antennas, determine that the feedback expression manner of the PMI and the CQI is the first feedback expression manner; or if it is determined that the quantity of configured antennas is greater than or equal to the first antenna quantity threshold, and in the quantity of configured antennas, a quantity of horizontally configured antennas is less than a quantity of vertically configured antennas, determine that the feedback expression manner of the PMI and the CQI is the second feedback expression manner; or if it is determined that the quantity of configured antennas is greater than or equal to the first antenna quantity threshold, and in the quantity of configured antennas, a quantity of horizontally configured antennas is equal to a quantity of vertically configured antennas, determine that the feedback expression manner of the PMI and the CQI is the first feedback expression manner or the second feedback expression manner.

Based on the first or the second possible implementation manner of the fifth aspect, in a third possible implementation manner, the first antenna quantity threshold is 32, and the second antenna quantity threshold is 16.

Based on the fifth aspect, in a fourth possible implementation manner, the sending module is specifically configured to send the feedback expression manner of the PMI and the CQI to the user equipment by using higher layer signaling.

According to a sixth aspect, a network device is provided, including a base station, and the network device specifically includes:

a transmitter, configured to send antenna configuration information to user equipment, where the antenna configuration information is used by the user equipment to determine, according to a quantity of configured antennas that is included in the antenna configuration information, a precoding matrix indicator PMI and a channel quality information CQI that need to be fed back, and a feedback expression manner of the PMI and the CQI, and send the PMI and the CQI to the network device in the determined feedback expression manner; or the network device further includes:

a processor, connected to the transmitter by using a communications bus, configured to determine a feedback expression manner of a PMI and a CQI according to the quantity of configured antennas that is included in the antenna configuration information, where the transmitter is further configured to send the feedback expression manner, determined by the processor, of the PMI and the CQI to the user equipment; and a receiver, connected to the processor by using the communications bus, and configured to receive the PMI and the CQI that are fed back by the user equipment in the feedback expression manner of the PMI and the CQI, where the feedback expression manner refers to a manner used to express the PMI and the CQI when the user equipment feeds back the PMI and the CQI, and the feedback expression manner includes at least a first feedback expression manner or a second feedback expression manner, where the first feedback expression manner includes: using T CQI values to express CQI of M codewords, and using one PMI value to indicate one PMI, where T is less than M and is greater than or equal to 1, M is greater than or equal to 2, and at least one CQI value of the T CQI values can express channel quality information of at least two codewords; and the second feedback expression manner includes: using M CQI values to express CQI of M codewords, and using one PMI value to indicate one PMI, where a bit quantity of at least one CQI value of the M CQI values is less than 3, and a bit quantity of at least one CQI value is greater than 3; where in any downlink physical resource block PRB pair that corresponds to the PMI and the CQI, any codeword of the M codewords is mapped on different downlink subcarriers to a same layer.

Based on the sixth aspect, in a first possible implementation manner, the processor is specifically configured to:

if the quantity of configured antennas is greater than or equal to a first antenna quantity threshold, determine that the feedback expression manner of the PMI and the CQI is the first feedback expression manner or the second feedback expression manner;

if the quantity of configured antennas is less than the first antenna quantity threshold, and is greater than or equal to a second antenna quantity threshold, determine that the feedback expression manner of the PMI and the CQI is the second feedback expression manner; or if the quantity of configured antennas is less than the second antenna quantity threshold, determine that the feedback expression manner of the PMI and the CQI is a third feedback expression manner, where the third feedback expression manner includes: using four bits of one PUCCH to express CQI of a first codeword, using three bits of one PUCCH to express CQI of a second codeword, and using four bits of one PUCCH to express the PMI.

Based on the first possible implementation manner of the sixth aspect, in a second possible implementation manner, the antenna configuration information further includes an antenna configuration pattern, and the antenna configuration pattern includes horizontal antenna configuration and vertical antenna configuration; and the processor is specifically configured to:

if it is determined that the quantity of configured antennas is greater than or equal to the first antenna quantity threshold, and in the quantity of configured antennas, a quantity of horizontally configured antennas is greater than a quantity of vertically configured antennas, determine that the feedback expression manner of the PMI and the CQI is the first feedback expression manner; or if it is determined that the quantity of configured antennas is greater than or equal to the first antenna quantity threshold, and in the quantity of configured antennas, a quantity of horizontally configured antennas is less than a quantity of vertically configured antennas, determine that the feedback expression manner of the PMI and the CQI is the second feedback expression manner; or if it is determined that the quantity of configured antennas is greater than or equal to the first antenna quantity threshold, and in the quantity of configured antennas, a quantity of horizontally configured antennas is equal to a quantity of vertically configured antennas, determine that the feedback expression manner of the PMI and the CQI is the first feedback expression manner or the second feedback expression manner.

Based on the first or the second possible implementation manner of the sixth aspect, in a third possible implementation manner, the first antenna quantity threshold is 32, and the second antenna quantity threshold is 16.

Based on the sixth aspect, in a fourth possible implementation manner, the transmitter is specifically configured to send higher layer signaling that includes the feedback expression manner of the PMI and the CQI to the user equipment by using an antenna.

In the present invention, user equipment determines a feedback expression manner of a PMI and a CQI, where the feedback expression manner includes a first or a second feedback expression manner, and sends the PMI and the CQI to a network device in the determined first or second feedback expression manner, where the first feedback expression manner includes: using T CQI values to express CQI of M codewords, and using one PMI value to indicate one PMI, where T is less than M, and there is at least one CQI value that can express CQI of at least two codewords; and the second feedback expression manner includes: using M CQI values to express CQI of M codewords, and using one PMI value to indicate one PMI, where a quantity of bits used in one PUCCH by at least one CQI value is less than 3, and a quantity of bits used in one PUCCH by at least one CQI value is greater than 3. Based on a feature (that is, as a quantity of configured antennas gradually increases, CQI relevancy of each layer or each codeword becomes higher) of a large-scale MIMO system, the feedback expression manner determined in the present invention can be effectively apply to a scenario in which the quantity of configured antennas increases.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 3-1 is a specific instance of mapping from a codeword to a layer according to an embodiment of the present invention;

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
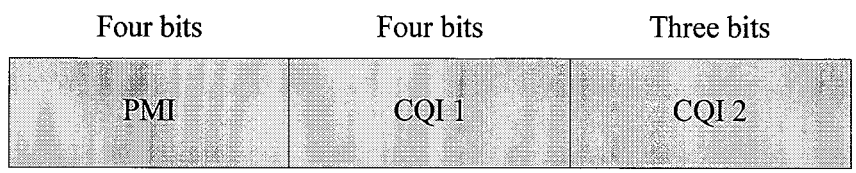
FIG. 1 is a schematic diagram of a CSI feedback expression manner used in the prior art.

FIG. 1 is a schematic diagram of a CSI feedback expression manner used in the prior art. In a current MIMO system, if a quantity of antennas configured in a network device (such as a base station) is two, four, or eight, and a quantity of sending layers is greater than or equal to two (that is, an RI is greater than or equal to 2), when UE feeds back CSI on a physical uplink control channel (Physical Uplink Control Channel, PUCCH), as shown in FIG. 1, the UE uses four bits in one PUCCH to express a PMI, uses four bits in one PUCCH to express CQI of a first codeword, and uses three bits in one PUCCH to express CQI of a second codeword, that is, a total quantity of bits used in one PUCCH for the PMI and the CQI is 11.

However, when the quantity of configured antennas increases, for example, when a quantity of downlink transmit antennas is 16, 32, or 64, no corresponding CSI feedback solution is provided in the prior art.

In the present invention, for a case in which a quantity of configured antennas increases, and a RI is greater than or equal to 2 (when a quantity of codewords is at least two), a new expression manner for feeding back CSI by UE is provided, and can be effectively applied to a scenario in which the quantity of configured antennas increases.

The technical solutions of the present invention may be applied to various wireless communications systems, such as a Global System for Mobile Communications (English: Global System for Mobile Communications, GSM for short) system, a General Packet Radio Service (English: General Packet Radio Service, GPRS for short) system, a Code Division Multiple Access (English: Code Division Multiple Access, CDMA for short) system, a CDMA2000 system, a Wideband Code Division Multiple Access (English: Wideband Code Division Multiple Access, WCDMA for short) system, a Long Term Evolution (English: Long Term Evolution, LTE for short) system, or a Worldwide Interoperability for Microwave Access (English: World Interoperability for Microwave Access, WiMAX for short) system.

Figure 2:
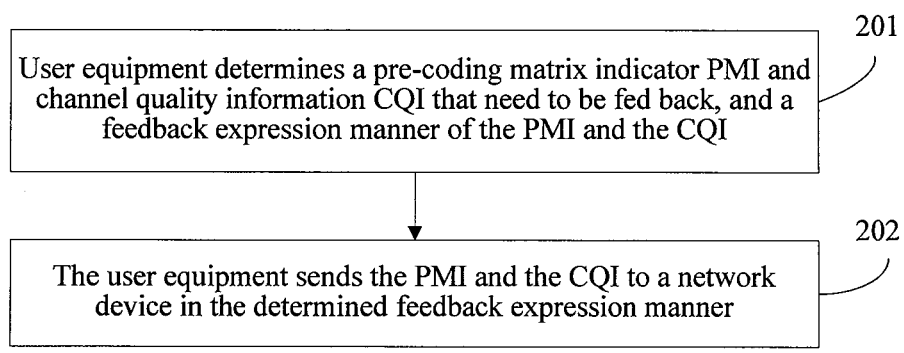
FIG. 2 is a schematic flowchart of a channel state information feedback method according to an embodiment of the present invention.

FIG. 2 is a schematic flowchart of a channel state information feedback method according to an embodiment of the present invention. As shown in FIG. 2, the channel state information feedback method in this embodiment may include:

201: User equipment determines a pre-coding matrix indicator PMI and a channel quality information CQI that need to be fed back, and a feedback expression manner of the PMI and the CQI.

The feedback expression manner refers to a manner used to express the PMI and the CQI when the user equipment feeds back the PMI and the CQI, and the feedback expression manner includes at least a first feedback expression manner or a second feedback expression manner, where the first feedback expression manner includes: using T CQI values to express CQI of M codewords, and using one PMI value to indicate one PMI, where T is less than M and is greater than or equal to 1, M is greater than or equal to 2, and at least one CQI value of the T CQI values can express channel quality information of at least two codewords; and the second feedback expression manner includes: using M CQI values to express CQI of M codewords, and using one PMI value to indicate one PMI, where a bit quantity of at least one CQI value of the M CQI values is less than 3, and a bit quantity of at least one CQI value is greater than 3; where in any downlink physical resource block PRB pair that corresponds to the PMI and the CQI, any codeword of the M codewords is mapped on different downlink subcarriers to a same layer. For example, when UE reports a PMI and a CQI, there are different reporting modes, and theses reporting modes have one thing in common, that is, each reported PMI or CQI corresponds to a particular bandwidth (that is, corresponds to a particular quantity of PRB pairs). For example, if the UE reports a broadband PMI and/or broadband CQI, they correspond to an entire system bandwidth. If the UE reports a broadband PMI, it is equivalent that the UE selects a public PMI from all PRB pairs of the entire downlink system bandwidth, and reports the public PMI to a base station. The UE considers that, a best effect is achieved when the base station performs pre-coding in the entire system bandwidth by using a pre-coding matrix that corresponds to this PMI. Similarly, if the UE reports not only the broadband PMI, but also the broadband CQI, it is equivalent that, the UE considers that, in the entire downlink system bandwidth, if the base station performs pre-coding by using a pre-coding matrix that corresponds to the reported broadband PMI, corresponding broadband CQI is the reported CQI. If the UE not only reports the broadband PMI, but also reports sub-band CQI, it is equivalent that, the UE considers that, in the entire downlink system bandwidth, if the base station performs pre-coding by using a pre-coding matrix that corresponds to the reported broadband PMI, CQI in this sub-band is the reported CQI, where one sub-band generally includes multiple PRB pairs, but a sub-band bandwidth is less than the system bandwidth.

In conclusion, downlink PRB pairs that correspond to a PMI refer to: on these PRB pairs, the UE expects the base station to perform pre-coding by using a pre-coding matrix that corresponds to this PMI, and this PMI is fed back to the base station; in addition, both the base station and the UE know which PRB pairs correspond to this PMI; therefore, these PRB pairs are the downlink PRB pairs that correspond to this PMI.

When the UE feeds back the PMI and the CQI, and when the base station performs, on these PRB pairs, pre-coding by using the pre-coding matrix of these PRB pairs that is fed back by the UE, CQI of these PRB pairs is the CQI fed back by the CQI. Therefore, downlink PRB pairs that correspond to CQI mean that, when the base station performs pre-coding by using the pre-coding matrix expected by the UE, the UE reports CQI (sub-band CQI, broadband CQI, or the like) of some PRB pairs, and these PRB pairs are PRB pairs that correspond to this CQI.

In any downlink PRB pair that corresponds to the PMI and the CQI, when PRB pairs corresponding to the PMI are not completely the same as PRB pairs corresponding to the CQI, the PRB pair that corresponds to the PMI and the CQI may be any one of the following cases:

including only the PRB pairs that correspond to the PMI;
including only the PRB pairs that correspond to the CQI;
including an intersection set of the PRB pairs that correspond to the PMI and the PRB pairs that correspond to the CQI; and
including a union set between the PRB pairs that correspond to the PMI and the PRB pairs that correspond to the CQI.

Figure 3:
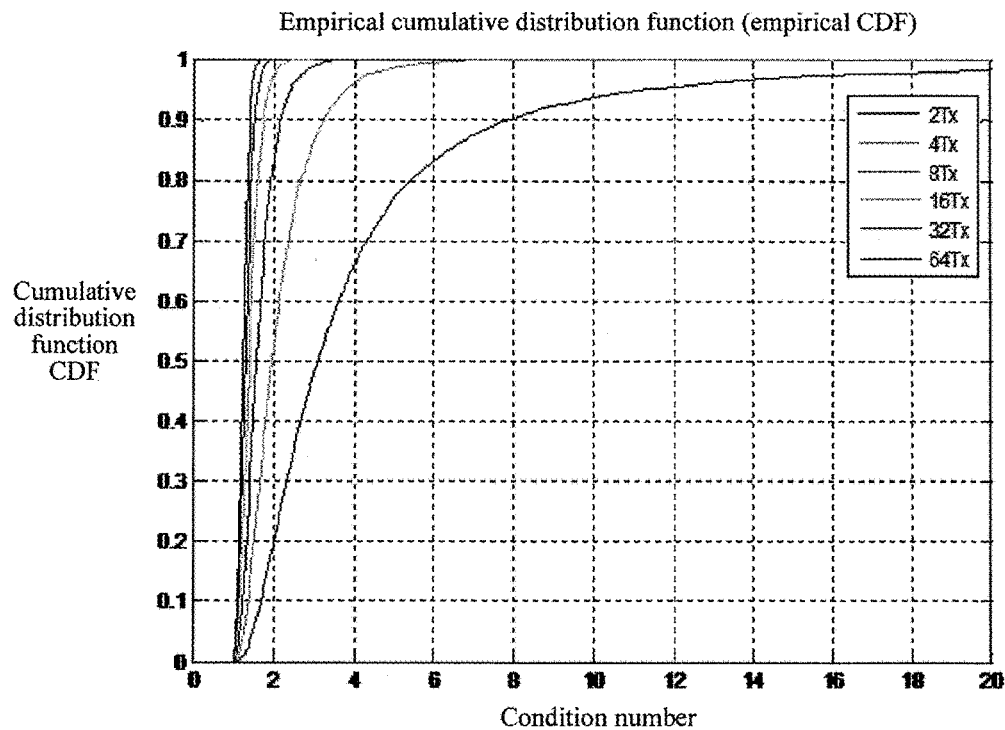
FIG. 3 is a schematic comparison diagram, which is obtained by means of emulation, of channel matrix condition numbers for different quantities of transmit antennas according to an embodiment of the present invention.
Figures 1, 3:
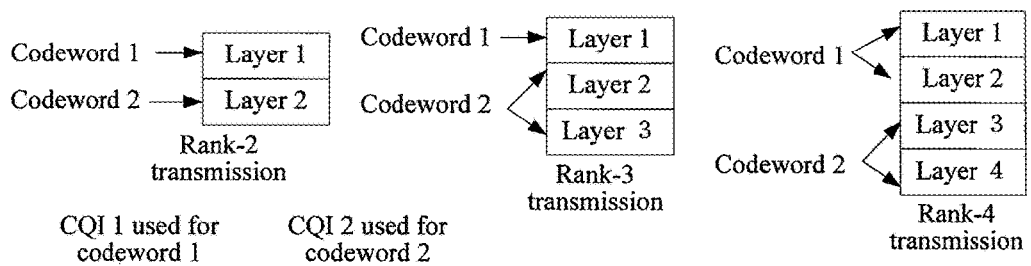

The M codewords are M channel coding codewords when the base station performs downlink transmission. In addition, mapping from a codeword to a layer is defined on both a base station side and a UE side. FIG. 3-1 provides an example for the mapping from a codeword to a layer. For specific details about the mapping from a codeword to a layer, reference may be made to 3GPP TS 36.211 V11.2.0. When the UE calculates a PMI and a CQI of a codeword that need to be fed back, it is assumed that the CQI of the codeword is obtained on the premise of the specified mapping from a codeword to a layer; and then any codeword of the M codewords is mapped on different downlink subcarriers to a same layer, that is, the UE obtains the CQI of the codeword on the premise that when the base station performs downlink data transmission, any codeword of the M codewords is mapped on different downlink subcarriers to a same layer. For example, there are two codewords, and a rank=2; a first codeword is mapped on all subcarriers of any PRB pair to the first layer, and a second codeword is mapped on all subcarriers of any PRB pair to the second layer.

For example, that user equipment determines a pre-coding matrix indicator PMI and a channel quality information CQI that need to be fed back may include:

the UE receives, on a pilot subcarrier, a pilot signal sent by the base station, and estimates a channel of the pilot subcarrier according to a pilot sequence that is locally generated by the UE or locally stored in the UE. A channel of a non-pilot subcarrier is obtained through interpolation according to the channel of the pilot subcarrier. In this way, channels of subcarriers are obtained. Then, according to a rank that is fed back, a best PMI under this rank is selected; for example, if a broadband (a system bandwidth) PMI and a broadband CQI need to be obtained in a case of a given rank, traversal is performed on pre-coding matrices under this rank in sequence, and a data sending rate that may be obtained in an entire bandwidth is calculated for each pre-coding matrix, so that a pre-coding matrix that has a maximum data sending rate may be selected. In addition, the UE obtains CQI of a corresponding bandwidth (the system bandwidth) according to the selected pre-coding matrix. Then, the UE feeds back, to the base station, a PMI corresponding to the selected pre-coding matrix; and the UE feeds back, to the base station, CQI that is obtained by the base station by performing pre-coding by using the pre-coding matrix. Similarly, if the UE needs to calculate a PMI and a CQI of a sub-band, it is only needed to change a bandwidth for calculating the PMI and the CQI to the sub-band. The foregoing describes a method of calculating a PMI and a CQI in a case of a given rank. When the UE needs to feed back a rank, the UE needs to traverse, in the entire system bandwidth, every PMI under every rank, to obtain a pre-coding matrix that has a maximum data sending rate, where a rank of this pre-coding matrix is the rank (which is equivalent to a best rank) that the UE needs to feed back. For a detailed process of feeding back a broadband/sub-band PMI/CQI and a rank, reference may be made to 3GPP TS 36.213 V11.2.0.

For example, that user equipment determines a feedback expression manner of the PMI and the CQI may include:

the user equipment determines the feedback expression manner of the PMI and the CQI according to antenna configuration information; or the user equipment determines the feedback expression manner of the PMI and the CQI according to higher layer signaling sent by the network device, where the higher layer signaling includes the feedback expression manner of the PMI and the CQI. For example, the higher layer signaling is Radio Resource Control (RRC) signaling. The network device may be a base station, a relay (Relay), a macro node (Macro Node), a pico node (Pico Node), or the like.

One PMI represents a PMI corresponding to at least one PRB pair, and one PRB pair has only one corresponding PMI. For mapping from any codeword to a layer, in one PRB pair, this codeword is mapped on each subcarrier to a same layer. Being mapped on each subcarrier to a same layer is equivalent that when the mapping from all codewords to a layer is performed, no layer shifting or equivalent change exists on different subcarriers for multiple codewords. Alternatively, for mapping from any codeword to a layer, in all PRB pairs corresponding to this PMI or in the system bandwidth, this codeword is mapped on all subcarriers to a same layer.

FIG. 3 is a schematic comparison diagram, which is obtained by means of emulation, of channel matrix condition numbers for different quantities of transmit antennas according to an embodiment of the present invention. In emulation, a channel for one transmit antenna and one receive antenna complies with single-path Rayleigh distribution; when a quantity of receive antennas is fixed (for example, a quantity of receive antennas is two), and when a quantity of transmit antennas is relatively large (for example, 2, 4, 8, 16, 32, or 64 transmit antennas), cumulative distribution function (cumulative distribution function, CDF) comparison for a channel matrix condition number is shown in FIG. 3, where a condition number (condition number) of a channel matrix is defined as a ratio of a maximum eigenvalue of this channel matrix to a minimum eigenvalue of this channel matrix. In addition, channel quality information of each layer is related to a corresponding eigenvalue, and a larger corresponding eigenvalue indicates better channel quality of this layer. It can be seen from FIG. 3 that, when a quantity of transmit antennas becomes larger, a channel matrix condition number is closer to 1. That is, in this case, the channel matrix condition number is very probably a number that is close to 1.

As shown in FIG. 3, when an antenna quantity is greater than or equal to 32, and when a cumulative distribution function value of the channel matrix condition number is 1, the channel matrix condition number approaches 1, that is, channel quality of all layers is relatively similar to each other. FIG. 3 is used as an example; a quantity of receive antennas is two, and then a maximum quantity of layers for sending data is two. Generally, in an MIMO system, a maximum quantity of layers for sending data is the minimum value of a quantity of transmit antennas and a quantity of receive antennas. When a quantity of layers is two, there are two channel coding codewords, and one codeword is mapped to one layer. Then, CQI of the two codewords is approximately the same. Therefore, in this embodiment, a first antenna quantity threshold may be set, and the first antenna quantity threshold is preferably 32.

FIG. 3-1 is a schematic diagram of mapping that is from a codeword to a layer and that is applied in an embodiment of the present invention. As shown in FIG. 3-1, it is assumed that a quantity of transmission layers is two, codeword 1 is mapped to layer 1, and codeword 2 is mapped to layer 2; if the quantity of transmission layers is three, codeword 1 is mapped to layer 1, and codeword 2 is mapped to layer 2 and layer 3; if the quantity of transmission layers is four, codeword 1 is mapped to layer 1 and layer 2, and codeword 2 is mapped to layer 3 and layer 4. It can be known from this that, if the quantity of sending layers is greater than or equal to two, when UE feeds back CSI, the CQI is reported by using two codewords, and each codeword is used to report one piece of CQI, where codeword 1 is used to report CQI 1, and codeword 2 is used to report CQI 2.

For another example, if an antenna quantity is less than 32 and greater than or equal to 16, when a cumulative distribution function value of the channel matrix condition number is 1, the channel matrix condition number approaches 2; that is, compared with the antenna quantity, CQI relevancy of each layer or codeword becomes lower, and in this case, a second antenna quantity threshold may be set, and the second antenna quantity threshold is preferably 16.

Based on an emulation result that is obtained in FIG. 3 and FIG. 3-1, the antenna configuration information includes a quantity of configured antennas, and the determining, by the user equipment, the feedback expression manner of the PHI and the CQI according to antenna configuration information includes:

if the quantity of configured antennas is greater than or equal to a first antenna quantity threshold, determining that the feedback expression manner of the PMI and the CQI is the first feedback expression manner or the second feedback expression manner;

if the quantity of configured antennas is less than the first antenna quantity threshold, and is greater than or equal to a second antenna quantity threshold, determining that the feedback expression manner of the PMI and the CQI is the second feedback expression manner; or if the quantity of configured antennas is less than the second antenna quantity threshold, determining that the feedback expression manner of the PMI and the CQI is a third feedback expression manner, where the third feedback expression manner is an existing feedback expression manner, and includes: using four bits of one PUCCH to express CQI of a first codeword, using three bits of one PUCCH to express CQI of a second codeword, and using four bits of one PUCCH to express the PMI.

It should be noted that, it is obtained through an emulation experiment that: independence of a channel of a horizontal antenna is higher than independence of a channel of a vertical antenna, CQI relevancy of the channel of the horizontal antenna is lower than CQI relevancy of the channel of the vertical antenna; therefore, the antenna configuration information further includes an antenna configuration pattern, and the antenna configuration pattern includes horizontal antenna configuration and vertical antenna configuration; and the, if the quantity of configured antennas is greater than or equal to a first antenna quantity threshold, determining that the feedback expression manner of the PMI and the CQI is the first feedback expression manner or the second feedback expression manner includes:

if it is determined that the quantity of configured antennas is greater than or equal to the first antenna quantity threshold, and in the quantity of configured antennas, a quantity of horizontally configured antennas is greater than a quantity of vertically configured antennas, determining that the feedback expression manner of the PMI and the CQI is the first feedback expression manner; or if it is determined that the quantity of configured antennas is greater than or equal to the first antenna quantity threshold, and in the quantity of configured antennas, a quantity of horizontally configured antennas is less than a quantity of vertically configured antennas, determining that the feedback expression manner of the PMI and the CQI is the second feedback expression manner; or if it is determined that the quantity of configured antennas is greater than or equal to the first antenna quantity threshold, and in the quantity of configured antennas, a quantity of horizontally configured antennas is equal to a quantity of vertically configured antennas, determining that the feedback expression manner of the PMI and the CQI is the first feedback expression manner or the second feedback expression manner.

Figure 4:
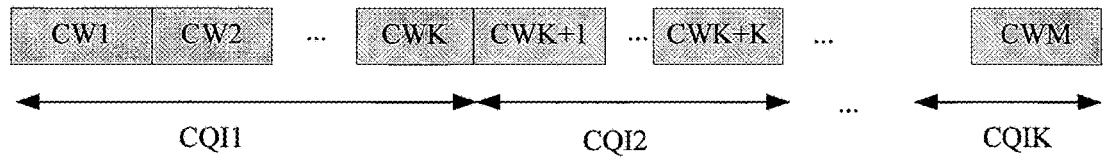
FIG. 4 is a schematic diagram of a first feedback expression manner applied in an embodiment of the present invention.

Further, FIG. 4 is a schematic diagram of a first feedback expression manner applied in an embodiment of the present invention. As shown in FIG. 4, if M/T=K, where K is a positive integer, CQI of K codewords may be expressed by using one CQI value.

202: The user equipment sends the PMI and the CQI to a network device in the determined feedback expression manner.

Based on the emulation result shown in FIG. 3, when the quantity of configured antennas gradually increases, independence of each channel is higher, and CQI relevancy of each channel is higher; to avoid increasing system overheads, when the UE feeds back the CSI, CQI of only two codewords (that is, M is equal to 2) may still be reported.

Figure 5:
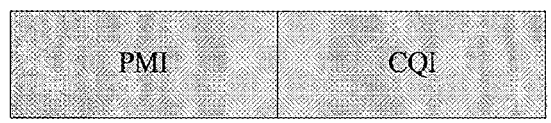
FIG. 5 is a schematic diagram of a channel state information feedback expression manner applied in an embodiment of the present invention.

FIG. 5 is a schematic diagram of a channel state information feedback expression manner applied in an embodiment of the present invention. As shown in FIG. 5, when M is equal to 2, the first feedback expression manner includes: using four bits (that is, one CQI value) of one PUCCH to express CQI of first and second codewords (CQI of two codewords). Compared with the feedback expression manner that is applied in the prior art shown in FIG. 1, the feedback expression manner shown in FIG. 5 saves three bits, reduces a quantity of bits for CQI feedback, and can reduce overheads of a feedback channel.

It should be noted that, when the quantity of configured antennas increases, a quantity of PMIs in a codebook increases accordingly, and it indicates that a quantity of indexes of the PMIs in the codebook also increases, which means that more bits are needed to express the PMIs.

In the first feedback expression manner the CQI of both the first and the second codewords is expressed by using four bits of one PUCCH; therefore, the saved three bits (that is, three bits corresponding to a channel quality indicator of the second codeword) may be used to express the PMI. Compared with the feedback expression manner that is applied in the prior art shown in FIG. 1, in the feedback expression manner shown in FIG. 5, the PMI is expressed by using a total of seven bits of one PUCCH, CQI of two codewords is expressed by using four bits of one PUCCH; in a case in which a quantity of bits for CSI feedback does not change, based on the emulation result shown in FIG. 3, when the quantity of configured antennas gradually increases, CQI relevancy of each layer or each codeword is higher, which can reduce bits for CQI feedback and increase bits for PMI feedback, can increase precision of the PMI feedback without reducing precision of the CQI feedback, and does not increase the overheads of the feedback channel.

Figure 6:
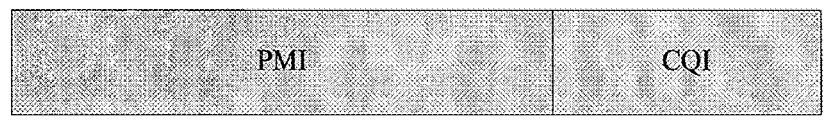
FIG. 6 is a schematic diagram of another channel state information feedback expression manner applied in an embodiment of the present invention.

FIG. 6 is a schematic diagram of another channel state information feedback expression manner applied in an embodiment of the present invention. As shown in FIG. 6, when M is equal to 2, the second feedback expression manner includes: using four bits of one PUCCH to express a channel quality indicator of a first codeword, using less than three bits of one PUCCH to express a channel quality indicator of a second codeword, and using four bits of one PUCCH to express a PMI. Compared with the feedback expression manner that is applied in the prior art shown in FIG. 1, the feedback expression manner shown in FIG. 6 can reduce a quantity of bits for CQI feedback without reducing precision of a codebook, and can reduce overheads of a feedback channel.

Based on a feature (that is, as a quantity of configured antennas gradually increases, CQI relevancy of each layer or each codeword becomes higher) of a large-scale MIMO system, the feedback expression manner of a PMI and a CQI determined in this embodiment of the present invention reduces bits for CQI feedback and increases bits for PMI feedback, and may be applied to a scenario in which the quantity of configured antennas increases, and overheads of a feedback channel are not increased when a quantity of bits of a PMI and a CQI that are fed back in a PUCCH does not exceed the prior-art 11 bits.

Figure 7:
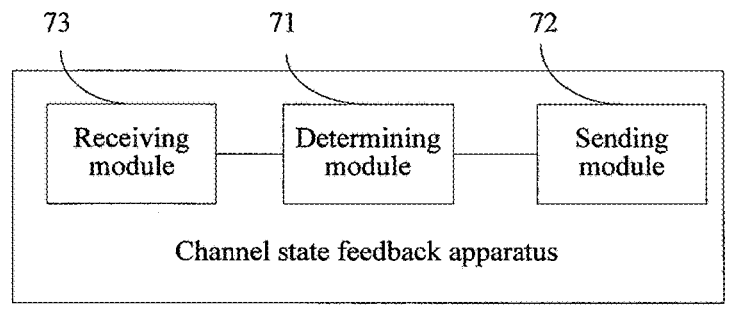
FIG. 7 is a schematic structural diagram of a channel state information feedback apparatus according to another embodiment of the present invention.

FIG. 7 is a schematic structural diagram of a channel state information feedback apparatus according to another embodiment of the present invention. The apparatus is located on a user equipment side, and can implement the method in the method embodiments corresponding to FIG. 1 to FIG. 6. As shown in FIG. 7, the apparatus includes:

a determining module 71, configured to determine a pre-coding matrix indicator PMI and a channel quality information CQI that need to be fed back, and a feedback expression manner of the PMI and the CQI, where the feedback expression manner refers to a manner used to express the PMI and the CQI when the user equipment feeds back the PMI and the CQI, and the feedback expression manner includes at least a first feedback expression manner or a second feedback expression manner; and a sending module 72, configured to send the PMI and the CQI to a network device in the determined feedback expression manner, where the first feedback expression manner includes: using T CQI values to express CQI of M codewords, and using one PMI value to indicate one PMI, where T is less than M and is greater than or equal to 1, M is greater than or equal to 2, and at least one CQI value of the T CQI values can express channel quality information of at least two codewords; and the second feedback expression manner includes: using M CQI values to express CQI of M codewords, and using one PMI value to indicate one PMI, where a bit quantity of at least one CQI value of the M CQI values is less than 3, and a bit quantity of at least one CQI value is greater than 3; where in any downlink physical resource block PRB pair that corresponds to the PMI and the CQI, any codeword of the M codewords is mapped on different downlink subcarriers to a same layer.

For example, the determining module 71 is specifically configured to:

determine the feedback expression manner of the PMI and the CQI according to antenna configuration information; or the apparatus further includes a receiving module 73, configured to receive higher layer signaling sent by the network device, where the higher layer signaling includes the feedback expression manner of the PMI and the CQI, where the determining module 71 is further configured to determine the feedback expression manner of the PMI and the CQI according to the feedback expression manner, which is included in the higher layer signaling received by the receiving module 73, of the PMI and the CQI.

If the antenna configuration information includes a quantity of configured antennas, the determining module 71 is specifically configured to:

if the quantity of configured antennas is greater than or equal to a first antenna quantity threshold, determine that the feedback expression manner of the PMI and the CQI is the first feedback expression manner or the second feedback expression manner;

if the quantity of configured antennas is less than the first antenna quantity threshold, and is greater than or equal to a second antenna quantity threshold, determine that the feedback expression manner of the PMI and the CQI is the second feedback expression manner; or if the quantity of configured antennas is less than the second antenna quantity threshold, determine that the feedback expression manner of the PMI and the CQI is a third feedback expression manner, where the third feedback expression manner includes: using four bits of one PUCCH to express CQI of a first codeword, using three bits of one PUCCH to express CQI of a second codeword, and using four bits of one PUCCH to express the PMI.

The antenna configuration information further includes an antenna configuration pattern, and the antenna configuration pattern includes horizontal antenna configuration and vertical antenna configuration; and the determining module 71 is specifically configured to:

if it is determined that the quantity of configured antennas is greater than or equal to the first antenna quantity threshold, and in the quantity of configured antennas, a quantity of horizontally configured antennas is greater than a quantity of vertically configured antennas, determine that the feedback expression manner of the PMI and the CQI is the first feedback expression manner; or if it is determined that the quantity of configured antennas is greater than or equal to the first antenna quantity threshold, and in the quantity of configured antennas, a quantity of horizontally configured antennas is less than a quantity of vertically configured antennas, determine that the feedback expression manner of the PMI and the CQI is the second feedback expression manner; or if it is determined that the quantity of configured antennas is greater than or equal to the first antenna quantity threshold, and in the quantity of configured antennas, a quantity of horizontally configured antennas is equal to a quantity of vertically configured antennas, determine that the feedback expression manner of the PMI and the CQI is the first feedback expression manner or the second feedback expression manner.

The first antenna quantity threshold is 32, and the second antenna quantity threshold is 16.

If M is equal to 2, the first feedback expression manner includes: using four bits of one PUCCH to express CQI of a first codeword and CQI of a second codeword, and using four or seven bits of one PUCCH to express the PMI.

If M is equal to 2, the second feedback expression manner includes: using four bits of one PUCCH to express CQI of a first codeword, using less than three bits of one PUCCH to express CQI of a second codeword, and using four bits of one PUCCH to express the PMI.

Based on a feature (that is, as a quantity of configured antennas gradually increases, CQI relevancy of each layer or each codeword becomes higher) of a large-scale MIMO system, the feedback expression manner of a PMI and a CQI determined in this embodiment of the present invention reduces bits for CQI feedback and increases bits for PMI feedback, and may be applied to a scenario in which the quantity of configured antennas increases, without reducing precision of a codebook and CSI feedback performance.

Further, in this embodiment, overheads of a feedback channel are not increased when a quantity of bits of a PMI and a CQI that are fed back in a PUCCH does not exceed the prior-art 11 bits.

Figure 8:
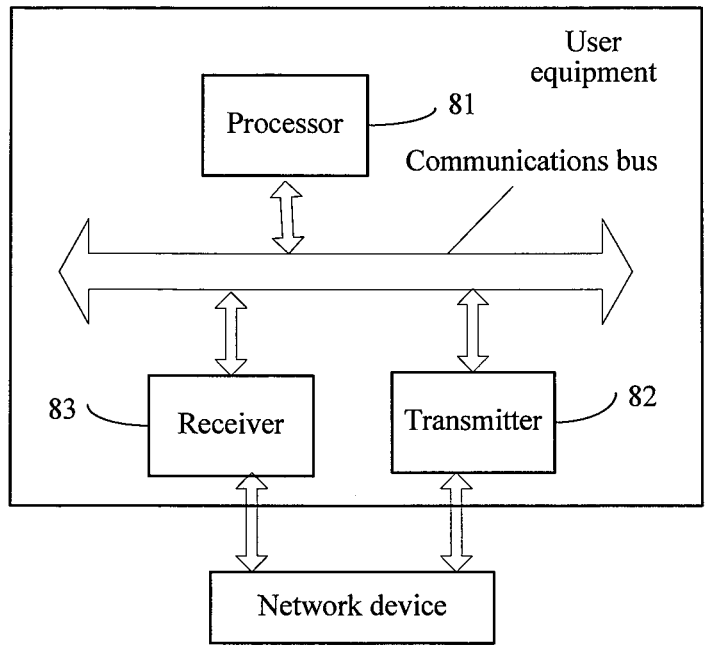
FIG. 8 is a schematic structural diagram of user equipment according to another embodiment of the present invention.

FIG. 8 is a schematic structural diagram of user equipment according to another embodiment of the present invention. The user equipment can implement the method in the method embodiments corresponding to FIG. 1 to FIG. 6. As shown in FIG. 8, the user equipment includes: a processor 81 and a transmitter 82, where the processor 81 is connected to the transmitter 82 by using a communications bus;

the processor 81 is configured to determine a pre-coding matrix indicator PMI and a channel quality information CQI that need to be fed back, and a feedback expression manner of the PMI and the CQI, where the feedback expression manner refers to a manner used to express the PMI and the CQI when the user equipment feeds back the PMI and the CQI, and the feedback expression manner includes at least a first feedback expression manner or a second feedback expression manner; and the transmitter 82 is configured to send the PMI and the CQI to a network device in the feedback expression manner determined by the processor 81, where the first feedback expression manner includes: using T CQI values to express CQI of M codewords, and using one PMI value to indicate one PMI, where T is less than M and is greater than or equal to 1, M is greater than or equal to 2, and at least one CQI value of the T CQI values can express channel quality information of at least two codewords; and the second feedback expression manner includes: using M CQI values to express CQI of M codewords, and using one PMI value to indicate one PMI, where a bit quantity of at least one CQI value of the M CQI values is less than 3, and a bit quantity of at least one CQI value is greater than 3; where in any downlink physical resource block PRB pair that corresponds to the PMI and the CQI, any codeword of the M codewords is mapped on different downlink subcarriers to a same layer.

For example, the processor 81 is specifically configured to:

determine the feedback expression manner of the PMI and the CQI according to antenna configuration information; or the user equipment further includes:

a receiver 83, connected to the processor 81 by using the communications bus, configured to receive higher layer signaling sent by the network device, where the higher layer signaling includes the feedback expression manner of the PMI and the CQI; and the processor 81 is specifically further configured to determine the feedback expression manner of the PMI and the CQI according to the higher layer signaling received by the receiver and sent by the network device.

The antenna configuration information includes a quantity of configured antennas, and the processor 81 is specifically configured to:

if the quantity of configured antennas is greater than or equal to a first antenna quantity threshold, determine that the feedback expression manner of the PMI and the CQI is the first feedback expression manner or the second feedback expression manner;

if the quantity of configured antennas is less than the first antenna quantity threshold, and is greater than or equal to a second antenna quantity threshold, determine that the feedback expression manner of the PMI and the CQI is the second feedback expression manner; or if the quantity of configured antennas is less than the second antenna quantity threshold, determine that the feedback expression manner of the PMI and the CQI is a third feedback expression manner, where the third feedback expression manner includes: using four bits of one PUCCH to express CQI of a first codeword, using three bits of one PUCCH to express CQI of a second codeword, and using four bits of one PUCCH to express the PMI.

The antenna configuration information further includes an antenna configuration pattern, and the antenna configuration pattern includes horizontal antenna configuration and vertical antenna configuration; and the processor 81 is specifically configured to:

if it is determined that the quantity of configured antennas is greater than or equal to the first antenna quantity threshold, and in the quantity of configured antennas, a quantity of horizontally configured antennas is greater than a quantity of vertically configured antennas, determine that the feedback expression manner of the PMI and the CQI is the first feedback expression manner; or if it is determined that the quantity of configured antennas is greater than or equal to the first antenna quantity threshold, and in the quantity of configured antennas, a quantity of horizontally configured antennas is less than a quantity of vertically configured antennas, determine that the feedback expression manner of the PMI and the CQI is the second feedback expression manner; or if it is determined that the quantity of configured antennas is greater than or equal to the first antenna quantity threshold, and in the quantity of configured antennas, a quantity of horizontally configured antennas is equal to a quantity of vertically configured antennas, determine that the feedback expression manner of the PMI and the CQI is the first feedback expression manner or the second feedback expression manner.

The first antenna quantity threshold is 32, and the second antenna quantity threshold is 16.

If M is equal to 2, the first feedback expression manner includes: using four bits of one PUCCH to express CQI of a first codeword and CQI of a second codeword, and using four or seven bits of one PUCCH to express the PMI.

If M is equal to 2, the second feedback expression manner includes: using four bits of one PUCCH to express CQI of a first codeword, using less than three bits of one PUCCH to express CQI of a second codeword, and using four bits of one PUCCH to express the PMI.

Based on a feature (that is, as a quantity of configured antennas gradually increases, CQI relevancy of each layer or each codeword becomes higher) of a large-scale MIMO system, the feedback expression manner of a PMI and a CQI determined in this embodiment of the present invention reduces bits for CQI feedback and increases bits for PMI feedback, and may be applied to a scenario in which the quantity of configured antennas increases, without reducing precision of a codebook and CSI feedback performance.

Further, in this embodiment, overheads of a feedback channel are not increased when a quantity of bits of a PMI and a CQI that are fed back in a PUCCH does not exceed the prior-art 11 bits.

Figure 9:
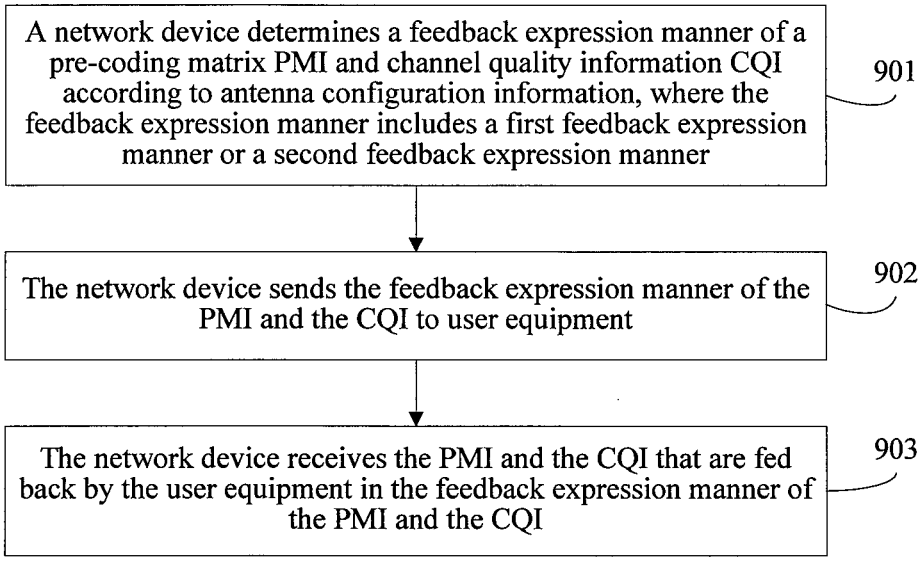
FIG. 9 is a schematic flowchart of a channel state information feedback method according to another embodiment of the present invention.

Corresponding to the method on a user equipment side in the method embodiments shown in FIG. 1 to FIG. 6, FIG. 9 is a schematic flowchart of a channel state information feedback method on a network device side according to another embodiment of the present invention. As shown in FIG. 9, the channel state information feedback method in this embodiment may include:

901: A network device determines a feedback expression manner of a PMI and a CQI according to antenna configuration information, where the feedback expression manner includes a first feedback expression manner or a second feedback expression manner.

The network device may include: a base station, a relay (Relay), a macro node (Macro Node), a pico node (Pico Node), or the like.

In an optical implementation manner of the present invention, the antenna configuration information includes a quantity of configured antennas, and step 901 includes:

if the quantity of configured antennas is greater than or equal to a first antenna quantity threshold, determining that the feedback expression manner of the PMI and the CQI is the first feedback expression manner or the second feedback expression manner, where the first feedback expression manner includes: using T channel quality information values to express channel quality information of M codewords, and using one pre-coding matrix value to express a pre-coding matrix, where T is less than M and is greater than or equal to 1, M is greater than or equal to 2, and at least one channel quality information value of the T channel quality information values express channel quality information of at least two codewords;

if the quantity of configured antennas is less than the first antenna quantity threshold, and is greater than or equal to a second antenna quantity threshold, determining that the feedback expression manner of the PMI and the CQI is the second feedback expression manner, where the second feedback expression manner includes: using M channel quality information values to express channel quality information of M codewords, and using one pre-coding matrix value to express a pre-coding matrix, where a bit quantity of at least one channel quality information value of the M codeword channel quality information values is less than 3, and a bit quantity of at least one channel quality information value is greater than 3; or if the quantity of configured antennas is less than the second antenna quantity threshold, determining that the feedback expression manner of the PMI and the CQI is a third feedback expression manner, where the third feedback expression manner may be an existing expression manner for feeding back the PMI and the CQI by the user equipment, that is, CQI of a first codeword is expressed by using four bits of one PUCCH, CQI of a second codeword is expressed by using three bits of one PUCCH, and the PMI is expressed by using four bits of one PUCCH.

In an optional implementation manner of the present invention, the antenna configuration information further includes an antenna configuration pattern, and the antenna configuration pattern includes horizontal antenna configuration and vertical antenna configuration; and the, if the quantity of configured antennas is greater than or equal to a first antenna quantity threshold, determining that the feedback expression manner of the PMI and the CQI is the first feedback expression manner or the second feedback expression manner includes:

if it is determined that the quantity of configured antennas is greater than or equal to the first antenna quantity threshold, and in the quantity of configured antennas, a quantity of horizontally configured antennas is greater than a quantity of vertically configured antennas, determining that the feedback expression manner of the PMI and the CQI is the first feedback expression manner;

if it is determined that the quantity of configured antennas is greater than or equal to the first antenna quantity threshold, and in the quantity of configured antennas, a quantity of horizontally configured antennas is less than a quantity of vertically configured antennas, determining that the feedback expression manner of the PMI and the CQI is the second feedback expression manner; or if it is determined that the quantity of configured antennas is greater than or equal to the first antenna quantity threshold, and in the quantity of configured antennas, a quantity of horizontally configured antennas is equal to a quantity of vertically configured antennas, determining that the feedback expression manner of the PMI and the CQI is the first feedback expression manner or the second feedback expression manner.

The first antenna quantity threshold is preferably 32, and the second antenna quantity threshold is preferably 16.

902: The network device sends the feedback expression manner of the PMI and the CQI to user equipment.

Specifically, the network device may send the feedback expression manner of the PMI and the CQI to the user equipment by using higher layer signaling, where, the higher layer signaling is, for example, radio resource control (Radio Resource Control, RRC) signaling.

Correspondingly, the user equipment sends the PMI and the CQI to the network device in the feedback expression manner of the PMI and the CQI. Specifically, reference may be made to related description in the embodiment shown in FIG. 2, and details are not described again.

903: The network device receives the PMI and the CQI that are fed back by the user equipment in the feedback expression manner of the PMI and the CQI.

In an optional implementation manner of the present invention, a network device sends antenna configuration information to user equipment, where the antenna configuration information is used by the user equipment to determine, according to a quantity of configured antennas that is included in the antenna configuration information, a pre-coding matrix indicator PMI and a channel quality information CQI that need to be fed back, and a feedback expression manner of the PMI and the CQI, and send the PMI and the CQI to the network device in the determined feedback expression manner; specifically, reference may be made to related description in the embodiment shown in FIG. 2, and details are not described again.

Based on a feature (that is, as a quantity of configured antennas gradually increases, CQI relevancy of each layer or each codeword becomes higher) of a large-scale MIMO system, the feedback expression manner of a PMI and a CQI determined in this embodiment of the present invention reduces bits for CQI feedback and increases bits for PMI feedback in the feedback expression manner of the PMI and the CQI, and therefore may be applied to a scenario in which the quantity of configured antennas increases, without reducing precision of a codebook and CSI feedback performance.

Further, in this embodiment, overheads of a feedback channel are not increased when a quantity of bits of a PMI and a CQI that are fed back in a PUCCH does not exceed the prior-art 11 bits.

Figure 10:
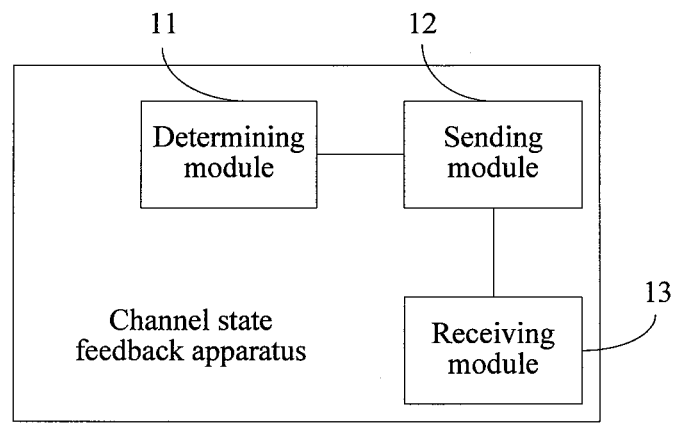
FIG. 10 is a schematic structural diagram of a channel state information feedback apparatus according to another embodiment of the present invention.

FIG. 10 is a schematic structural diagram of a channel state information feedback apparatus according to another embodiment of the present invention. The apparatus can implement the method in the method embodiment corresponding to FIG. 9, and is located on a network device side. As shown in FIG. 10, the apparatus includes:

a sending module 11, configured to send antenna configuration information to user equipment, where the antenna configuration information is used by the user equipment to determine, according to a quantity of configured antennas that is included in the antenna configuration information, a pre-coding matrix indicator PMI and a channel quality information CQI that need to be fed back, and a feedback expression manner of the PMI and the CQI, and send the PMI and the CQI to the network device in the determined feedback expression manner; or the apparatus further includes:

a determining module 12, configured to determine a feedback expression manner of a PMI and a CQI according to a quantity of configured antennas that is included in the antenna configuration information, where the sending module 11 is further configured to send the feedback expression manner of the PMI and the CQI to the user equipment; and a receiving module 13, configured to receive the PMI and the CQI that are fed back by the user equipment in the feedback expression manner of the PMI and the CQI, where the feedback expression manner refers to a manner used to express the PMI and the CQI when the user equipment feeds back the PMI and the CQI, and the feedback expression manner includes at least a first feedback expression manner or a second feedback expression manner, where the first feedback expression manner includes: using T CQI values to express CQI of M codewords, and using one PMI value to indicate one PMI, where T is less than M and is greater than or equal to 1, M is greater than or equal to 2, and at least one CQI value of the T CQI values can express channel quality information of at least two codewords; and the second feedback expression manner includes: using M CQI values to express CQI of M codewords, and using one PMI value to indicate one PMI, where a bit quantity of at least one CQI value of the M CQI values is less than 3, and a bit quantity of at least one CQI value is greater than 3; where in any downlink physical resource block PRB pair that corresponds to the PMI and the CQI, any codeword of the M codewords is mapped on different downlink subcarriers to a same layer.

For example, the determining module 12 is specifically configured to:

if the quantity of configured antennas is greater than or equal to a first antenna quantity threshold, determine that the feedback expression manner of the PMI and the CQI is the first feedback expression manner or the second feedback expression manner;

if the quantity of configured antennas is less than the first antenna quantity threshold, and is greater than or equal to a second antenna quantity threshold, determine that the feedback expression manner of the PMI and the CQI is the second feedback expression manner; or if the quantity of configured antennas is less than the second antenna quantity threshold, determine that the feedback expression manner of the PMI and the CQI is a third feedback expression manner, where the third feedback expression manner includes: using four bits of one PUCCH to express CQI of a first codeword, using three bits of one PUCCH to express CQI of a second codeword, and using four bits of one PUCCH to express the PMI.

For example, the antenna configuration information further includes an antenna configuration pattern, and the antenna configuration pattern includes horizontal antenna configuration and vertical antenna configuration; and the determining module 12 is specifically configured to:

if it is determined that the quantity of configured antennas is greater than or equal to the first antenna quantity threshold, and in the quantity of configured antennas, a quantity of horizontally configured antennas is greater than a quantity of vertically configured antennas, determine that the feedback expression manner of the PMI and the CQI is the first feedback expression manner; or if it is determined that the quantity of configured antennas is greater than or equal to the first antenna quantity threshold, and in the quantity of configured antennas, a quantity of horizontally configured antennas is less than a quantity of vertically configured antennas, determine that the feedback expression manner of the PMI and the CQI is the second feedback expression manner; or if it is determined that the quantity of configured antennas is greater than or equal to the first antenna quantity threshold, and in the quantity of configured antennas, a quantity of horizontally configured antennas is equal to a quantity of vertically configured antennas, determine that the feedback expression manner of the PMI and the CQI is the first feedback expression manner or the second feedback expression manner.

The first antenna quantity threshold is 32, and the second antenna quantity threshold is 16.

For example, the sending module 11 is specifically configured to send the feedback expression manner of the PMI and the CQI to the user equipment by using higher layer signaling.

Based on a feature (that is, as a quantity of configured antennas gradually increases, CQI relevancy of each layer or each codeword becomes higher) of a large-scale MIMO system, the feedback expression manner of a PMI and a CQI determined in this embodiment of the present invention reduces bits for CQI feedback and increases bits for PMI feedback in the feedback expression manner of the PMI and the CQI, and therefore may be applied to a scenario in which the quantity of configured antennas increases, without reducing precision of a codebook and CSI feedback performance.

Further, in this embodiment, overheads of a feedback channel are not increased when a quantity of bits of a PMI and a CQI that are fed back in a PUCCH does not exceed the prior-art 11 bits.

Figure 11:
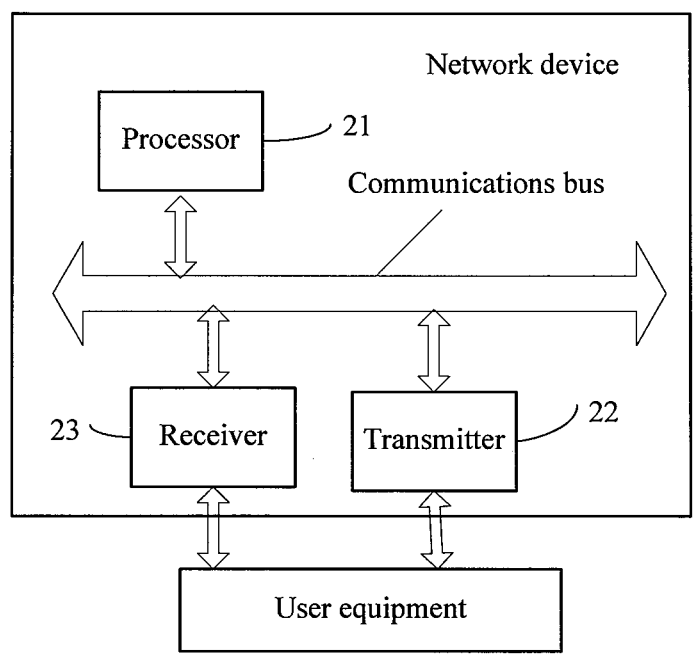
FIG. 11 is a schematic structural diagram of a network device according to another embodiment of the present invention.

FIG. 11 is a schematic structural diagram of a network device according to another embodiment of the present invention. The network device can implement the method in the method embodiments corresponding to FIG. 1 to FIG. 6, where the network device may specifically include a base station, a relay (Relay), a macro node (Macro Node), a pico node (Pico Node), or the like. As shown in FIG. 11, the network device includes:

a transmitter 21, configured to send antenna configuration information to user equipment, where the antenna configuration information is used by the user equipment to determine, according to a quantity of configured antennas that is included in the antenna configuration information, a precoding matrix indicator PMI and a channel quality information CQI that need to be fed back, and a feedback expression manner of the PMI and the CQI, and send the PMI and the CQI to the network device in the determined feedback expression manner; or the network device further includes:

a processor 22, connected to the transmitter 21 by using a communications bus, configured to determine a feedback expression manner of a PMI and a CQI according to a quantity of configured antennas that is included in the antenna configuration information, where the transmitter 21 is further configured to send the feedback expression manner, determined by the processor, of the PMI and the CQI to the user equipment; and a receiver 23, connected to the transmitter 21 by using the communications bus, and configured to receive the PMI and the CQI that are fed back by the user equipment in the determined feedback expression manner, where the feedback expression manner refers to a manner used to express the PMI and the CQI when the user equipment feeds back the PMI and the CQI, and the feedback expression manner includes at least a first feedback expression manner or a second feedback expression manner, where the first feedback expression manner includes: using T CQI values to express CQI of M codewords, and using one PMI value to indicate one PMI, where T is less than M and is greater than or equal to 1, M is greater than or equal to 2, and at least one CQI value of the T CQI values can express channel quality information of at least two codewords; and the second feedback expression manner includes: using M CQI values to express CQI of M codewords, and using one PMI value to indicate one PMI, where a bit quantity of at least one CQI value of the M CQI values is less than 3, and a bit quantity of at least one CQI value is greater than 3; where in any downlink physical resource block PRB pair that corresponds to the PMI and the CQI, any codeword of the M codewords is mapped on different downlink subcarriers to a same layer.

For example, the processor 22 is specifically configured to:

if the quantity of configured antennas is greater than or equal to a first antenna quantity threshold, determine that the feedback expression manner of the PMI and the CQI is the first feedback expression manner or the second feedback expression manner;

if the quantity of configured antennas is less than the first antenna quantity threshold, and is greater than or equal to a second antenna quantity threshold, determine that the feedback expression manner of the PMI and the CQI is the second feedback expression manner; or if the quantity of configured antennas is less than the second antenna quantity threshold, determine that the feedback expression manner of the PMI and the CQI is a third feedback expression manner, where the third feedback expression manner includes: using four bits of one PUCCH to express CQI of a first codeword, using three bits of one PUCCH to express CQI of a second codeword, and using four bits of one PUCCH to express the PMI.

For example, the antenna configuration information further includes an antenna configuration pattern, and the antenna configuration pattern includes horizontal antenna configuration and vertical antenna configuration; and the processor 22 is specifically configured to:

if it is determined that the quantity of configured antennas is greater than or equal to the first antenna quantity threshold, and in the quantity of configured antennas, a quantity of horizontally configured antennas is greater than a quantity of vertically configured antennas, determine that the feedback expression manner of the PMI and the CQI is the first feedback expression manner; or if it is determined that the quantity of configured antennas is greater than or equal to the first antenna quantity threshold, and in the quantity of configured antennas, a quantity of horizontally configured antennas is less than a quantity of vertically configured antennas, determine that the feedback expression manner of the PMI and the CQI is the second feedback expression manner; or if it is determined that the quantity of configured antennas is greater than or equal to the first antenna quantity threshold, and in the quantity of configured antennas, a quantity of horizontally configured antennas is equal to a quantity of vertically configured antennas, determine that the feedback expression manner of the PMI and the CQI is the first feedback expression manner or the second feedback expression manner.

The first antenna quantity threshold is 32, and the second antenna quantity threshold is 16.

For example, the transmitter 21 is specifically configured to send higher layer signaling that includes the feedback expression manner of the PMI and the CQI to the user equipment by using an antenna.

Based on a feature (that is, as a quantity of configured antennas gradually increases, CQI relevancy of each layer or each codeword becomes higher) of a large-scale MIMO system, the feedback expression manner of a PMI and a CQI determined in this embodiment of the present invention reduces bits for CQI feedback and increases bits for PMI feedback in the feedback expression manner of the PMI and the CQI, and therefore may be applied to a scenario in which the quantity of configured antennas increases, without reducing precision of a codebook and CSI feedback performance.

Further, in this embodiment, overheads of a feedback channel are not increased when a quantity of bits of a PMI and a CQI that are fed back in a PUCCH does not exceed the prior-art 11 bits.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary: For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a portable hard drive, a read-only memory (English: Read-Only Memory, ROM for short), a random access memory (English: Random Access Memory, RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the protection scope of the technical solutions of the embodiments of the present invention.

What is claimed is:

1. A channel state information feedback method, comprising:
   determining, by user equipment, a Pre-coding Matrix Indicator (PMI) and a Channel Quality Information (CQI) that need to be fed back, and a feedback expression manner of the PMI and the CQI, wherein the feedback expression manner refers to a manner used to express the PMI and the CQI when the user equipment feeds back the PMI and the CQI, and the feedback expression manner comprises at least a first feedback expression manner or a second feedback expression manner;
   sending, by the user equipment, the PMI and the CQI to a network device in the determined feedback expression manner, wherein:
      the first feedback expression manner comprises: using T CQI values to express CQI of M codewords, and using one PMI value to indicate one PMI, wherein T and M are integers, wherein T is less than M and is greater than or equal to 1, M is greater than or equal to 2, and at least one CQI value of the T CQI values can express channel quality information of at least two codewords, and
      the second feedback expression manner comprises: using M CQI values to express CQI of M codewords, and using one PMI value to indicate one PMI, wherein a bit quantity of at least one CQI value of the M CQI values is less than 3, and a bit quantity of at least one CQI value is greater than 3; and
   wherein in any downlink physical resource block (PRB) pair that corresponds to the PMI and the CQI, any codeword of the M codewords is mapped on different downlink subcarriers to a same layer.

2. The method according to claim 1, wherein determining, by user equipment, a feedback expression manner of the PMI and the CQI comprises:
   determining, by the user equipment, the feedback expression manner of the PMI and the CQI according to antenna configuration information; or
   determining, by the user equipment, the feedback expression manner of the PMI and the CQI according to higher layer signaling sent by the network device, wherein the higher layer signaling comprises the feedback expression manner of the PMI and the CQI.

3. The method according to claim 2, wherein:
the antenna configuration information comprises a quantity of configured antennas; and
determining, by the user equipment, the feedback expression manner of the PMI and the CQI according to antenna configuration information comprises:
   if the quantity of configured antennas is greater than or equal to a first antenna quantity threshold, determining that the feedback expression manner of the PMI and the CQI is the first feedback expression manner or the second feedback expression manner, and
   if the quantity of configured antennas is less than the first antenna quantity threshold, and is greater than or equal to a second antenna quantity threshold, determining that the feedback expression manner of the PMI and the CQI is the second feedback expression manner, or if the quantity of configured antennas is less than the second antenna quantity threshold, determining that the feedback expression manner of the PMI and the CQI is a third feedback expression manner, wherein the third feedback expression manner comprises: using four bits of one Physical Uplink Control Channel (PUCCH) to express CQI of a first codeword, using three bits of one PUCCH to express CQI of a second codeword, and using four bits of one PUCCH to express the PMI.

4. The method according to claim 3, wherein the antenna configuration information further comprises an antenna configuration pattern comprising a horizontal antenna configuration and a vertical antenna configuration; and
if the quantity of configured antennas is greater than or equal to a first antenna quantity threshold, determining that the feedback expression manner of the PMI and the CQI is the first feedback expression manner or the second feedback expression manner comprises:
if it is determined that the quantity of configured antennas is greater than or equal to the first antenna quantity threshold, and in the quantity of configured antennas, a quantity of horizontally configured antennas is greater than a quantity of vertically configured antennas, determining that the feedback expression manner of the PMI and the CQI is the first feedback expression manner; or
if it is determined that the quantity of configured antennas is greater than or equal to the first antenna quantity threshold, and in the quantity of configured antennas, a quantity of horizontally configured antennas is less than a quantity of vertically configured antennas, determining that the feedback expression manner of the PMI and the CQI is the second feedback expression manner; or
if it is determined that the quantity of configured antennas is greater than or equal to the first antenna quantity threshold, and in the quantity of configured antennas, a quantity of horizontally configured antennas is equal to a quantity of vertically configured antennas, determining that the feedback expression manner of the PMI and the CQI is the first feedback expression manner or the second feedback expression manner.

5. The method according to claim 3, wherein the first antenna quantity threshold is 32 and the second antenna quantity threshold is 16.

6. The method according to claim 1, wherein when M is equal to 2, the first feedback expression manner comprises:
using four bits of one Physical Uplink Control Channel (PUCCH) to express CQI of a first codeword and CQI of a second codeword, and using four or seven bits of one PUCCH to express the PMI.

7. The method according to claim 1, wherein when M is equal to 2, the second feedback expression manner comprises:
using four bits of one Physical Uplink Control Channel (PUCCH) to express CQI of a first codeword, using less than three bits of one PUCCH to express CQI of a second codeword, and using four bits of one PUCCH to express the PMI.

8. User equipment, comprising: a processor and a transmitter, wherein the processor is connected to the transmitter by using a communications bus;
the processor configured to determine a Pre-coding Matrix Indicator (PMI) and a Channel Quality Information (CQI) that need to be fed back, and a feedback expression manner of the PMI and the CQI, wherein the feedback expression manner refers to a manner used to express the PMI and the CQI when the user equipment feeds back the PMI and the CQI, and the feedback expression manner comprises at least a first feedback expression manner or a second feedback expression manner;
the transmitter, coupled to the processor by using the communications bus, configured to send the PMI and the CQI to a network device in the feedback expression manner determined by the processor, wherein:
the first feedback expression manner comprises: using T CQI values to express CQI of M codewords, and using one PMI value to indicate one PMI, wherein T and M are integers, wherein T is less than M and is greater than or equal to 1, M is greater than or equal to 2, and at least one CQI value of the T CQI values can express channel quality information of at least two codewords, and
the second feedback expression manner comprises: using M CQI values to express CQI of M codewords, and using one PMI value to indicate one PMI, wherein a bit quantity of at least one CQI value of the M CQI values is less than 3, and a bit quantity of at least one CQI value is greater than 3; and
wherein in any downlink physical resource block (PRB) pair that corresponds to the PMI and the CQI, any codeword of the M codewords is mapped on different downlink subcarriers to a same layer.

9. The user equipment according to claim 8, wherein:
the processor is configured to:
determine the feedback expression manner of the PMI and the CQI according to antenna configuration information; or
the user equipment further comprises a receiver, coupled to the processor by using the communications bus, wherein the receiver is configured to receive higher layer signaling sent by the network device, wherein the higher layer signaling comprises the feedback expression manner of the PMI and the CQI; and
the processor is further configured to determine the feedback expression manner of the PMI and the CQI according to the higher layer signaling received by the receiver and sent by the network device.

10. The user equipment according to claim 9, wherein:
the antenna configuration information comprises a quantity of configured antennas; and
the processor is configured to:
if the quantity of configured antennas is greater than or equal to a first antenna quantity threshold, determine that the feedback expression manner of the PMI and the CQI is the first feedback expression manner or the second feedback expression manner;
if the quantity of configured antennas is less than the first antenna quantity threshold, and is greater than or equal to a second antenna quantity threshold, determine that the feedback expression manner of the PMI and the CQI is the second feedback expression manner; or
if the quantity of configured antennas is less than the second antenna quantity threshold, determine that the feedback expression manner of the PMI and the CQI is a third feedback expression manner, wherein the third feedback expression manner comprises: using four bits of one Physical Uplink Control Channel (PUCCH) to express CQI of a first codeword, using three bits of one PUCCH to express CQI of a second codeword, and using four bits of one PUCCH to express the PMI.

11. The user equipment according to claim 10, wherein:
the antenna configuration information further comprises an antenna configuration pattern comprising a horizontal antenna configuration and a vertical antenna configuration; and
the processor is configured to:
if it is determined that the quantity of configured antennas is greater than or equal to the first antenna quantity threshold, and in the quantity of configured antennas, a quantity of horizontally configured antennas is greater than a quantity of vertically configured antennas, determine that the feedback expression manner of the PMI and the CQI is the first feedback expression manner, or
if it is determined that the quantity of configured antennas is greater than or equal to the first antenna quantity threshold, and in the quantity of configured antennas, a quantity of horizontally configured antennas is less than a quantity of vertically configured antennas, determine that the feedback expression manner of the PMI and the CQI is the second feedback expression manner, or
if it is determined that the quantity of configured antennas is greater than or equal to the first antenna quantity threshold, and in the quantity of configured antennas, a quantity of horizontally configured antennas is equal to a quantity of vertically configured antennas, determine that the feedback expression manner of the PMI and the CQI is the first feedback expression manner or the second feedback expression manner.

12. The user equipment according to claim 10, wherein the first antenna quantity threshold is 32, and the second antenna quantity threshold is 16.

13. The user equipment according to claim 8, wherein when M is equal to 2, the first feedback expression manner comprises:
using four bits of one Physical Uplink Control Channel (PUCCH) to express CQI of a first codeword and CQI of a second codeword, and using four or seven bits of one PUCCH to express the PMI.

14. The user equipment according to claim 8, wherein when M is equal to 2, the second feedback expression manner comprises:
using four bits of one Physical Uplink Control Channel (PUCCH) to express CQI of a first codeword, using less than three bits of one PUCCH to express CQI of a second codeword, and using four bits of one PUCCH to express the PMI.

15. A network device, comprising:
a transmitter, configured to send antenna configuration information to user equipment, wherein the antenna configuration information is used by the user equipment to determine, according to a quantity of configured antennas that is comprised in the antenna configuration information, a Pre-coding Matrix Indicator (PMI) and a Channel Quality Information (CQI) that need to be fed back, and a feedback expression manner of the PMI and the CQI, and send the PMI and the CQI to the network device in the determined feedback expression manner;
a processor, connected to the transmitter by using a communications bus, configured to determine the feedback expression manner of the PMI and the CQI according to a quantity of configured antennas that is comprised in the antenna configuration information, wherein the transmitter is further configured to send the feedback expression manner, determined by the processor, of the PMI and the CQI to the user equipment;
a receiver, connected to the processor by using the communications bus, and configured to receive the PMI and the CQI that are fed back by the user equipment in the feedback expression manner of the PMI and the CQI, wherein the feedback expression manner refers to a manner used to express the PMI and the CQI when the user equipment feeds back the PMI and the CQI, and the feedback expression manner comprises at least a first feedback expression manner or a second feedback expression manner, wherein:
the first feedback expression manner comprises: using T CQI values to express CQI of M codewords, and using one PMI value to indicate one PMI, wherein T and M are integers, wherein T is less than M and is greater than or equal to 1, M is greater than or equal to 2, and at least one CQI value of the T CQI values can express channel quality information of at least two codewords, and
the second feedback expression manner comprises: using M CQI values to express CQI of M codewords, and using one PMI value to indicate one PMI, wherein a bit quantity of at least one CQI value of the M CQI values is less than 3, and a bit quantity of at least one CQI value is greater than 3; and
wherein in any downlink physical resource block PRB pair that corresponds to the PMI and the CQI, any codeword of the M codewords is mapped on different downlink subcarriers to a same layer.

16. The network device according to claim 15, wherein the processor is configured to:
if the quantity of configured antennas is greater than or equal to a first antenna quantity threshold, determine that the feedback expression manner of the PMI and the CQI is the first feedback expression manner or the second feedback expression manner; and
if the quantity of configured antennas is less than the first antenna quantity threshold, and is greater than or equal to a second antenna quantity threshold, determine that the feedback expression manner of the PMI and the CQI is the second feedback expression manner; or if the quantity of configured antennas is less than the second antenna quantity threshold, determine that the feedback expression manner of the PMI and the CQI is a third feedback expression manner, wherein the third feedback expression manner comprises: using four bits of one Physical Uplink Control Channel (PUCCH) to express CQI of a first codeword, using three bits of one PUCCH to express CQI of a second codeword, and using four bits of one PUCCH to express the PMI.

17. The network device according to claim 16, wherein:
the antenna configuration information further comprises an antenna configuration pattern comprising a horizontal antenna configuration and a vertical antenna configuration; and
the processor is configured to:
if it is determined that the quantity of configured antennas is greater than or equal to the first antenna quantity threshold, and in the quantity of configured antennas, a quantity of horizontally configured antennas is greater than a quantity of vertically configured antennas, determine that the feedback expression manner of the PMI and the CQI is the first feedback expression manner, or if it is determined that the quantity of configured antennas is greater than or equal to the first antenna quantity threshold, and in the quantity of configured antennas, a quantity of horizontally configured antennas is less than a quantity of vertically configured antennas, determine that the feedback expression manner of the PMI and the CQI is the second feedback expression manner, or if it is determined that the quantity of configured antennas is greater than or equal to the first antenna quantity threshold, and in the quantity of configured antennas, a quantity of horizontally configured antennas is equal to a quantity of vertically configured antennas, determine that the feedback expression manner of the PMI and the CQI is the first feedback expression manner or the second feedback expression manner.

18. The network device according to claim 16, wherein the first antenna quantity threshold is 32, and the second antenna quantity threshold is 16.

19. The network device according to claim 15, wherein the transmitter is configured to:

send higher layer signaling that comprises the feedback expression manner of the PMI and the CQI to the user equipment by using an antenna.

\* \* \* \* \*